United States Patent
Albizuri Landazabal et al.

(10) Patent No.: US 9,480,358 B2
(45) Date of Patent: Nov. 1, 2016

(54) GAS BARBECUE

(71) Applicant: COPRECITEC, S.L., Aretxabaleta (ES)

(72) Inventors: Iñigo Albizuri Landazabal, Muxika (ES); Jose Ignacio Mugica Odriozola, Bergara (ES)

(73) Assignee: Coprecitec, S.L., Aretxabaleta (ES)

( * ) Notice: Subject to any disclaimer, the term of this patent is extended or adjusted under 35 U.S.C. 154(b) by 274 days.

(21) Appl. No.: 14/251,385

(22) Filed: Apr. 11, 2014

(65) Prior Publication Data

US 2015/0150404 A1    Jun. 4, 2015

(30) Foreign Application Priority Data

Dec. 4, 2013  (ES) .................................. 201330521

(51) Int. Cl.
  *A47J 27/62*    (2006.01)
  *A47J 37/07*    (2006.01)

(52) U.S. Cl.
  CPC ............. *A47J 27/62* (2013.01); *A47J 37/0713* (2013.01); *A47J 37/0786* (2013.01)

(58) Field of Classification Search
  CPC ... A47J 37/0713; A47J 37/0786; A47J 27/62
  USPC .... 99/332; 126/25 R, 39 R, 42, 512; 431/45, 431/72, 80, 87, 125
  See application file for complete search history.

(56) References Cited

U.S. PATENT DOCUMENTS

| | | | |
|---|---|---|---|
| 3,429,340 A | 2/1969 | Opel et al. | |
| 4,392,059 A * | 7/1983 | Nespor | F02N 11/101 123/179.2 |
| 5,450,841 A | 9/1995 | Whitaker et al. | |
| 5,611,327 A | 3/1997 | Teixeira Filho et al. | |
| 5,954,089 A * | 9/1999 | Seymour | F16K 31/0675 137/487.5 |
| 6,000,390 A | 12/1999 | Evers et al. | |
| 6,289,792 B1 | 9/2001 | Grando et al. | |

(Continued)

FOREIGN PATENT DOCUMENTS

| CA | 2020680 C | 3/1997 |
|---|---|---|
| EP | 2053314 A2 | 4/2009 |

OTHER PUBLICATIONS

Search Report and Written Opinion, dated Jan. 1, 2015 and performed by the Spanish Patent Office for Spanish application 201330521, filing date Apr. 12, 2013, Madrid Spain.

(Continued)

*Primary Examiner* — Thien S Tran
(74) *Attorney, Agent, or Firm* — Edell, Shapiro & Finnan LLC

(57) ABSTRACT

A gas barbecue having a cut-off valve situated between a gas inlet and a gas burner. According to some implementations the cut-off valve has a control knob moveable to a first position and a second position, in the first position of the control knob the cut-off valve is maintained in an open position, in the second position of the control knob the cut-off valve is placed under the control of an electrical control unit that acts upon an electromagnet assembly of the cut-off valve to control the open and close position of the cut-off valve. When the control knob is in the second position the electrical control unit is able to wirelessly exchange information and/or instructions with a remote control unit, whereas when the control knob is in the first position the electrical control unit is unable to wirelessly exchange information and/or instructions with the remote control unit.

20 Claims, 2 Drawing Sheets

(56) References Cited

U.S. PATENT DOCUMENTS

| | | |
|---|---|---|
| 8,413,648 B2 | 4/2013 | Querejeta Andueza et al. |
| 2006/0260603 A1 | 11/2006 | Shah |
| 2007/0028912 A1 | 2/2007 | Gagas et al. |
| 2007/0128562 A1 | 6/2007 | Thomas |
| 2008/0108002 A1* | 5/2008 | Huang .................... F23N 5/102 431/80 |
| 2009/0078245 A1 | 3/2009 | Chang |
| 2009/0104573 A1* | 4/2009 | Chen ....................... F24C 3/126 431/72 |
| 2009/0159068 A1 | 6/2009 | Querejeta et al. |
| 2011/0146649 A1 | 6/2011 | Brenner |
| 2012/0115096 A1* | 5/2012 | Gadini .................... F23K 5/007 431/87 |

OTHER PUBLICATIONS

Search Report and Written Opinion, dated Jan. 1, 2015 and performed by the Spanish Patent Office for Spanish application 201330521, filing date Apr. 12, 2013, Madrid Spain (partial translation of written opinion in English).

Extended European Search Report, dated Jun. 16, 2014, performed by the European Patent Office for EP Application No. 14382111.4, Munich Germany.

* cited by examiner

GAS BARBECUE

CROSS-REFERENCE TO RELATED APPLICATIONS

This application relates to and claims the benefit and priority to Spanish Patent Application P201330521, filed Apr. 12, 2013.

TECHNICAL FIELD

The present invention relates to barbecues, and more specifically to gas barbecues for domestic use.

BACKGROUND

Gas barbecues comprise an enclosure with at least one cooking surface on which foods to be cooked can be arranged. Gas barbecues comprising a gas supply line, one or more burners which are arranged below the cooking surface, and one conduit for the passage of gas for each burner connected to the gas supply line, are known In the state of the art.

U.S. Pat. No. 6,289,792 B1 discloses a gas barbecue for grilling foods. The barbecue comprises a cooking surface, one or several burners below the cooking surface, each of the burners with a conduit for the passage of gas, a main gas line connected to an external gas supply and provided with a cut-off valve, the main line being connected to the gas conduits of each burner, a control unit, which is a timer, suitable for controlling the cut-off valve, being able to keep the cut-off valve open for a predefined amount of time, and a control knob comprising a first manual position allowing the passage of gas through the cut-off valve and a second position in which the timer acts.

SUMMARY OF THE DISCLOSURE

According to some implementations a gas barbecue is provided that comprises a cooking surface, at least one burner below the cooking surface, each of the burners with a conduit for the passage of gas, a main gas line connected to an external gas supply and provided with a cut-off valve, the main line being connected to the gas conduits of each burner, a control unit suitable for controlling the cut-off valve, and a control knob comprising a first manual position allowing the passage of gas through the cut-off valve. The control knob comprises a second supervising position allowing the user to monitor and control the operation of the barbecue, once it is turned on, remotely by means of a remote control unit, activating the control unit and putting the control unit in contact with the remote control unit by means of exchanging instructions.

According to some implementations the barbecue comprises a control unit incorporated into the barbecue that is capable of communicating with a remote control unit which the user can carry on his/her person. Placing the control knob in the second supervising position allows, once the barbecue is turned on, activating the control unit and putting the control unit in contact with the remote control unit, exchanging instructions. Therefore, the user does not have to worry about cooking, being able to move away from the barbecue with utmost security. When the control knob is placed in the second position, the control unit is placed in an active state and is able to send information related to the operation and/or status of the barbecue to the remote control unit so that the user can monitor, i.e., to observe remotely what occurs in the barbecue, and also allows the user to remotely control the operation of the barbecue, i.e., sending instructions to the barbecue via the control unit. Monitoring and controlling the operation of the barbecue may comprise safety functions, such as for example, closing the cut-off valve and therefore turning off the barbecue at the user's will or automatically closing the cut-off valve when the user moves a predetermined distance away from the barbecue. Other functions that can be monitored and controlled are the cooking time, for example, or post-cooking functions, following recipes by controlling times and the power of the burners and informing the user when his/her physical or remote intervention on the barbecue is required, sending signals informing that specific temperatures have been reached, etc.

These and other advantages and features will become evident in view of the drawings and the detailed description.

DETAILED DESCRIPTION

Figure 1:
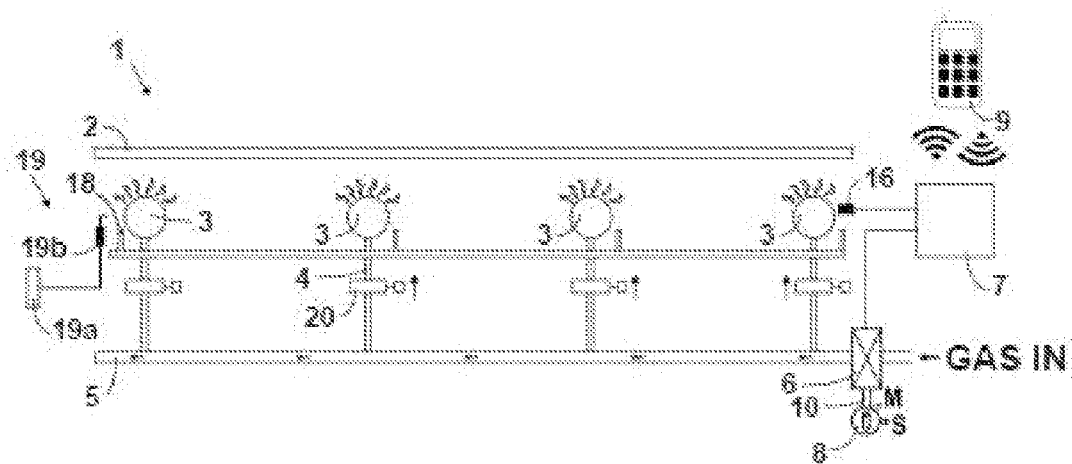
FIG. 1 schematically shows the main parts of a barbecue according to one implementation.

FIG. 1 shows an outdoor barbecue 1 of the type powered by means of gas, such as natural gas (NG) or liquefied petroleum gas (LPG). According to one implementation the barbecue 1 comprises at least one cooking surface 2 on which foods to be cooked can be arranged, four burners 3 arranged below the surface 2 which heat the surface 2 when the barbecue 1 is operating. According to the implementation illustrated in FIG. 1, the burners 3 are substantially cylindrical with holes arranged in the upper area for the exit of gas, a diagram of the barbecue 1 being shown in FIG. 1 with a front view, such that the burners 3 are shown as circles. The surface 2 can be a single surface for all the burners 3, but it can also share a different number of burners 3, the number of surfaces 2 and the number of burners 3 in a barbecue being able to be different.

The barbecue 1 comprises a gas inlet, shown in FIG. 1 as GAS IN, through which gas can be supplied to the different burners 3, and which is in turn connected to an external gas supply (not shown in the drawings). The gas is distributed along a main line 5, and conduits 4 come out of this main line 5 to each of the burners 3 for feeding them. According to some implementations the barbecue 1 comprises a gas flow cock 20 associated with each burner 3, such that the cock 20 is arranged in each of the conduits 4 between the main line 5 and each burner 3 for the purpose of regulating the passage of gas to the burner. The cock 20 is preferably a conventional rotary type cock, acting on a conventional flow valve, not detailed in the drawings, which when operated causes the valve to allow the passage of more gas or less depending on the position of the flow valve. The cock 20 comprises a position in which no passage of gas to the burner 3 is allowed until the position of the cock 20 is modified. Therefore, when the gas supply from the main line 5 and through the gas conduits 4 towards the burners 3 is allowed, the gas flow cocks 20 allow the user to regulate the gas flow to the burners 3 in an individual manner.

The barbecue 1 also comprises a control unit 7 which can in turn comprise a processor "P" that allows controlling the opening and closing of a cut-off valve 6, and therefore allows or does not allow the passage of gas towards the burners 3. The control unit 7 is arranged in the barbecue 1 itself. The barbecue 1 further comprises a control knob 8 which may be arranged in a control panel (not shown in the drawings) of the barbecue 1. According to some implementations the control knob 8 comprises at least two positions, a first manual position "M" in which the passage of gas through the cut-off valve 6 is allowed and the user can start up the barbecue to cook the food, by operating the corresponding gas flow cocks 20, since the gas can reach the burners 3 from the external gas supply. When the user arranges the control knob 8 in a second position "S", also called a supervising position, the user is allowed to monitor and control the operation of the barbecue 1 remotely by means of a remote control unit 9, the positioning of the control knob 8 in the second position "S" activating the control unit 7. The activated control unit 7 allows the passage of gas through the cut-off valve 6, and it allows contacting with the remote control unit 9, emitting and receiving signals in the contact which allow exchanging instructions. According to some implementations the control knob 8 comprises an OFF position preceding the first manual position. When the control knob 8 is in the OFF position the barbecue is in a shut-down mode with the cut-off valve 6 being closed and the control unit 7 being deactivated.

The barbecue 1 may be put into operation by arranging the control knob 8 in the first position "M". This first position "M" is a position which allows the user to operate the barbecue 1 manually, the user physically acting on the barbecue 1. Since the first position "M" allows the passage of gas through the cut-off valve 6, the user can turn on the burners 3 by operating the gas cocks 20. If due to any circumstance the user wants or needs to move away from the barbecue 1, he/she can arrange the control knob 8 in the second position "S", and the second position "S" allows keeping the passage of gas through the cut-off valve 6 open, after putting the barbecue 1 into operation in the first position "M", so the barbecue 1 can continue to operate. When the control knob 8 is in the second position "S", the control unit 7 is placed in an active state with the control unit 7 activated and in communication with the remote control unit 9. The user carries the remote control unit 9 and wherever the user is located, he/she can receive instructions and/or information from the barbecue 1 through the control unit 7 or can send instructions from the remote control unit 9 to the barbecue 1 through the control unit 7.

Figure 2:
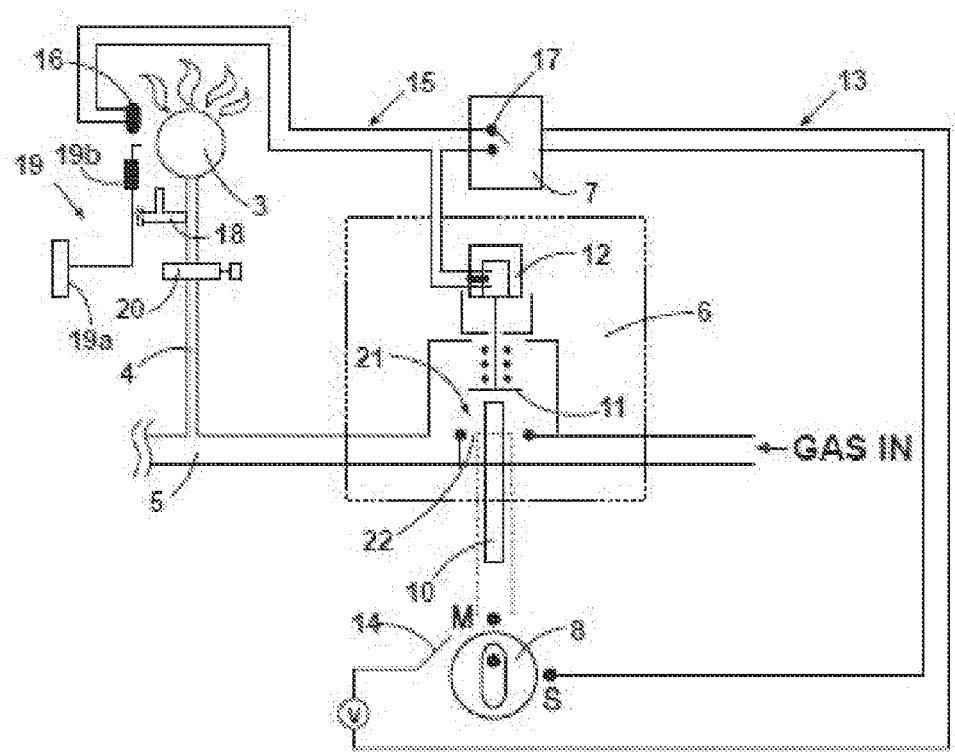
FIG. 2 schematically shows the link between the control knob, the cut-off valve, the control unit, and a burner of the barbecue of FIG. 1 according to one implementation.

FIG. 2 schematically shows a link according to some implementations existing between the cut-off valve 6, the control unit 7, the control knob 8, and a burner 3 attached to the main gas supply line 5 by means of a gas conduit 4 with an intercalated gas flow cock 20, of the barbecue 1 shown in FIG. 1. To be able to allow the passage of gas through the cut-off valve 6 when the control knob 8 is in the first position "M", the cut-off valve 6 comprises a mechanical element 10 linked to the control knob 8, for example, attaching by means of an intermediate spiral-shaped element (not shown in the drawings) attached to the control knob 8, such that when the control knob 8 is arranged in the first position "M", the mechanical element 10, which can be a rod, is shifted. The cut-off valve 6 comprises a magnetic group 12 of the type known in the art with a metal core and an electric current surrounding it, generating an electromagnetic field, comprising a moveable shaft with a spring surrounding it, and a mobile element 11, for example in the form of a disc, at the end of the movable shaft, such that when electric current is passed around the magnetic core, the magnetic field generates a force that keeps the mobile element 11 adhered to or otherwise urged toward the base of the magnetic core.

The main gas line 5 incorporates the cut-off valve 6, such that in the area of the main line 5 where the cut-off valve 6 is located, the main line 5 has an area 21 for closing the passage of gas with a passage 22 in which the mobile element 11 of the magnetic group 12 can be coupled. Therefore, when the control knob 8 is in the first position "M", the mechanical element 10 is shifted and one end keeps the mobile element 11 in a position to permit the flow of gas through the passage 22 to permit the gas to circulate towards the burners 3. When the control knob 8 is arranged in the second supervising position "S", the mechanical element 10 is moved to no longer block movement of the mobile element 11. However, given the mechanical features of the mobile element 11, and while electric current circulates around the magnetic core of the magnetic group 12, the attractive force that is exerted on the mobile element 11 allows keeping the mobile unit 11 adhered to or urged toward the base of the magnetic core. The passage 22 of the passage area 21 of the main line 5 is thus kept open, and the gas is permitted to circulate towards the burners 3.

Figure 3:
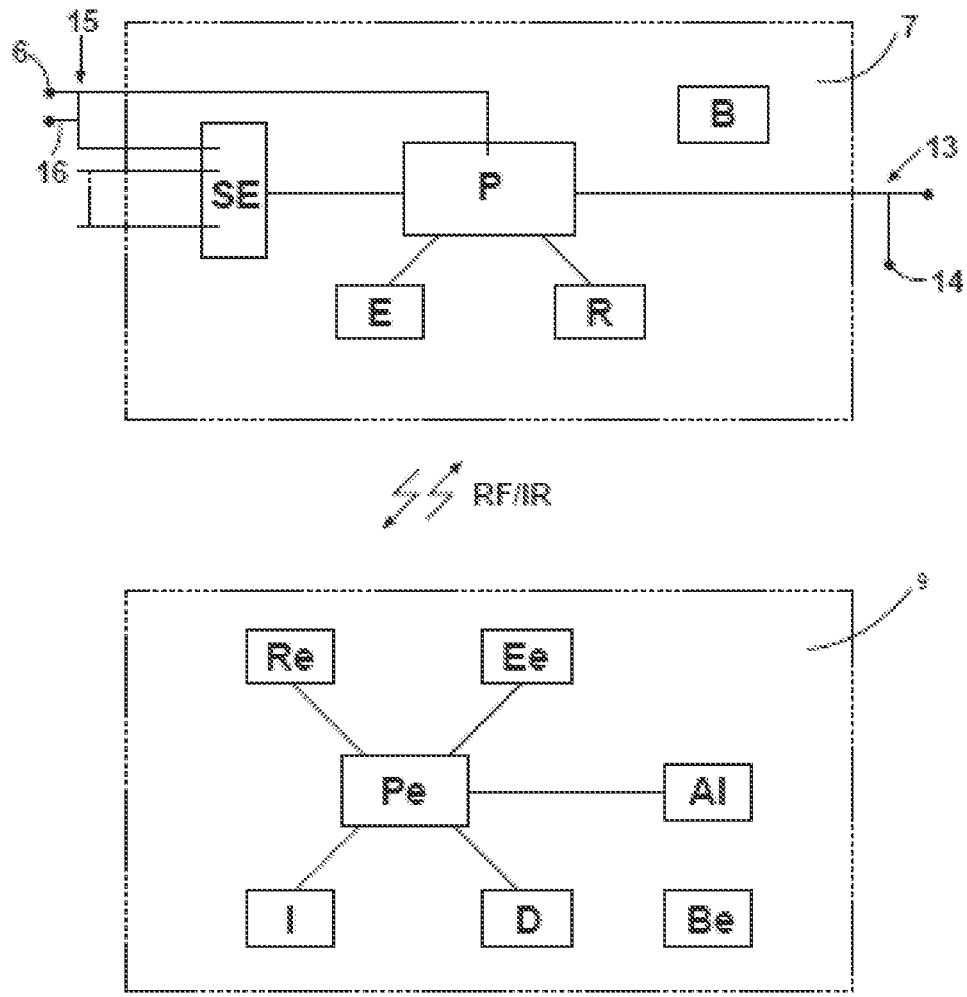
FIG. 3 schematically shows the control unit and the remote control unit of the barbecue of FIG. 1 according to one implementation.

FIG. 3 schematically shows a control unit 7 and a remote control unit 9 of the barbecue 1 of FIG. 1 according to some implementations. The control unit 7 may comprise at least one emitter "E" and one receiver "R" which allow emitting and receiving signals to and from the remote control unit 9, respectively. The signals exchanged between the control unit 7 and the remote control unit 9 carries information and instructions which allow monitoring and controlling the operation of the barbecue 1, the signals being radio frequency "RF" type signals or infrared "IR" type signals. The control unit 7 also comprises a processor "P" for processing the information and instructions that will be emitted or have been received, it therefore being linked to the emitter "E" and to the receiver "R", and an external sensor receiver unit "SE" which is also linked to the processor "P". The external sensor receiver unit "SE" can comprise a plurality of sensors that have been arranged in the barbecue 1 which allow collecting signals indicative of the operation of the barbecue 1 or of the state of the food that is being cooked.

The sensors can be safety sensors, for example, which allow closing the gas cut-off valve 6, and therefore turning off the barbecue 1. A safety sensor can be, for example, a flame sensor 16, such as a thermocouple, arranged on the side of each burner 3 such that it sends a signal to the processor "P" as long as it detects the presence of flame in the burner 3, and when it detects the absence of flame in the burner 3, the processor "P" does not receive the signal and at least in some circumstances closes the cut-off valve 6 when the control knob 8 is in the second supervising position "S". Another safety sensor can be, for example, a presence sensor (not shown in the drawings) which is in wireless contact with the remote control unit 9, such that when the user carrying the remote control unit 9 is more than a specific distance away, the processor "P" closes the cut-off valve 6 for safety reasons, provided that the control knob 8 is in the second position "S". The sensors available in the barbecue 1 can also monitor another type of functions related to cooking foods. For example, a sensor can be a temperature probe which is arranged in the food to be cooked, such that the temperature signals are transmitted to the processor "P" and are transmitted to the remote control unit 9 by means of the emitter "E". The user therefore having an ability to know how the cooking of the food is progressing at all times. With or without this information the user can send instructions to the barbecue 1 through the remote control unit 9 to the control unit 7, and can control the cooked food by regulating cooking times with the timer incorporated in the processor "P", adding condiments or other foods to the food that is being cooked, and regulating the power of the burners 3, turning them off and on as required by the recipe used.

The control unit 7 may also comprise a rechargeable battery "B" allowing the control unit 7 to keep functioning regardless of an external power supply failure. The control unit 7 may also comprise a connection with an electric circuit 13 supplying energy to the processor "P". As shown in FIG. 2, this electric circuit 13 may comprise a connection unit "V" for connection with an external power supply means, and a switch 14 in series with the external power supply means which is linked to the control knob 8. When the control knob 8 is arranged in the first position "M", the cut-off valve 6 is open and allows the passage of gas and the switch 14 is open, the power supply not reaching the processor "P" and the processor "P" therefore not being activated. According to some implementations the rechargeable battery "B" powers the processor "P" only when the control knob 8 is in the second position "S". When the control knob 8 is arranged in the second position "S" the switch 14 is closed and the power supply reaches the control unit 7. This allows activating the processor "P" and putting the control unit 7 in contact with the remote control unit 9, and the barbecue 1 can be monitored because it can send signals through the emitter "E", and can receive signals through the receiver "R", the opening or closing of the cut-off valve 6 and therefore the passage of the gas being able to be controlled.

The control unit 7 may also comprise a connection with an electric control circuit 15 which allows connecting the control unit 7 with the cut-off valve 6 and in some instances the flame sensor 16. According to some implementations the electric control circuit 15 comprises a flame sensor 16 adjacent to one or more of the burners 3, and in some instances to each of the burners 3, each flame sensor 16 being linked with the processor "P" through the external sensor receiver unit "SE". The electric control circuit 15 may also comprise a switch 17 arranged in series, the switch 17 being linked to the processor "P". The electric control circuit 15 is in turn connected in series with the magnetic group 12 of the cut-off valve 6, such that coils powered through the control circuit surround the metal core of the magnetic group 12. When a burner 3 is turned on, the flame sensor 16 detects the presence of flame and an electric current circulating through the electric control circuit 15 is generated. This current generates a magnetic field in the magnetic group 12, generating a force which allows keeping the mobile element 11 adhered to or otherwise urged toward the base of the magnetic core, which thus allows keeping the gas passage 22 in the cut-off valve 6 open. If there is no flame in the burner 3, there will be no electric current in the electric control circuit 15, the attractive force applied to the mobile element 11 no longer exists, and the mobile element 11 closes the gas passage 22, provided that the control knob 8 is in the second position "S". Similarly, an instruction for closing the cut-off valve 6 can arrive from the remote control unit 9, for which the processor "P" opens the switch 17 and the electric current no longer circulates in the magnetic group 12, the cut-off valve 6 being closed and therefore there being no gas circulation towards the burners 3.

To be able to perform the described functions, the remote control unit 9 comprises in some implementations, as shown in FIG. 3, an emitter $E_e$ and a receiver $R_e$ which allow emitting and receiving signals to and from the control unit 7, respectively. It also comprises a processor "$P_e$" for processing the instructions or information, which is linked to the emitter $E_e$ and to the receiver $R_e$. The remote control unit 9 is a wireless mobile unit and is therefore not physically attached with the control unit 7, so the user can carry it on his/her person. The remote control unit can be a unit specifically designed for the barbecue 1, but can also be a smart mobile telephone or other mobile device constructed on a mobile computing platform. The mobile telephone or other mobile device may have, among other features, multitasking function, the mobile telephone comprising a plurality of computer applications "Al" which are committed to memory in the processor "$P_e$". This multitasking function of the mobile telephone allows applying the computer applications "Al" in the safety and cooking functions described.

The remote control unit 9 also comprises a user interface "I" which is linked to the processor "$P_e$" allowing the user to enter information in the remote control unit 9. The remote control unit 9 also comprises a display screen "D" linked to the processor "$P_e$" allowing the user to view the information received from the control unit 7, and therefore from the barbecue 1, and also the information entered in the remote control unit 9 through the interface "I". The remote control unit 9 may also comprise a battery "$B_e$" which allows powering the processor "$P_e$", and therefore all the elements linked with the processor "$P_e$".

In the implementation of the barbecue 1 shown in FIG. 1, the barbecue 1 comprises a pilot 18 adjacent to the burners 3. According to some implementations the pilot 18 is a common conduit for all the burners 3 comprising a gas outlet for each of the burners 3. According to other implementations the barbecue 1 may comprise one pilot 18 for each burner 3. Upon the use of a common conduit, the pilot 18 is connected to the gas outlet for the exit of gas towards one of the burners 3, such that when the cock 20 corresponding to the burner 3 is open, the common conduit of the pilot 18 is filled with gas, having a common pilot flame which allows turning on the rest of the burners 3 and activating the flame sensor 16. According to some implementations the flame sensor 16 is positioned adjacent to the outlet of the pilot 18 of the burner 3. If the barbecue 1 does not comprise electronic ignition means the user can turn on the burner 3 with manual means connected in the gas outlet connection thereof with the common conduit of the pilot 18, such as a lighter or matches, opening the corresponding cock 20, and the burner 3 and the outlets of the pilot 18 being turned on. The common conduit of the pilot 18 may be a conduit with microperforations along its entire length, so a plurality of small flames is propagated throughout the conduit. At the height of each burner 3, the microperforations become a groove or a hole with a larger diameter which functions as a pilot. Therefore, when the burner 3 is turned on, the common conduit with multiple small flames is turned on, a pilot flame being located adjacent to each of the burners 3. Therefore, when the user wants to turn on a second burner 3, he/she only has to open the corresponding cock 20. According to such an implementation, the flame sensor 16 may be arranged to detect the presence of flame in the outlet of the pilot 18 and sends the signal to the control unit 7.

In the implementation of the barbecue 1 shown in FIG. 1, the barbecue 1 comprises a flame ignition device 19 for the burners 3. The ignition device 19 comprises an ignition button 19a and an ignition electrode 19b, the ignition electrode 19b being adjacent to the burner 3 and to the outlet of the common pilot 18 where the ignition of the barbecue 1 is started. Therefore, when the user wants to turn on the barbecue 1, he/she arranges the control knob in the first position "M", opens the cock 20 corresponding to the burner 3, presses the button 19a and generates sparks in the ignition electrode 19b, lighting the flame in the burner 3, and also lighting the flame in the remaining outlets of the pilot 18. When desired, the user can turn on another burner 3 by opening the corresponding gas flow cock 20. In other implementations (not shown in the drawings) the barbecue 1 can comprise an ignition device 19 associated with the control unit 7, such that the control unit 7 controls an electronic spark generator, the control unit 7 causing sparks to be generated in the ignition electrode 19b when the control unit 7 detects that the control knob 8 is arranged in the first position "M", and the opening of the cock 20 corresponding to the burner 3, where the ignition of the barbecue 1 is started by means of a rotary switch or similar device associated with the cock 20 (not shown in the drawings) is detected.

What is claimed is:

1. A gas barbecue comprising:
   a gas burner,
   a gas supply conduit system configured to direct a gas from a gas inlet to the gas burner,
   a cut-off valve situated in the gas supply conduit system, the cut-off valve comprising a magnetic group having a mobile element, the mobile element moveable between a first position and a second position, the mobile element capable of being moved between the first and second positions by a movement of a mechanical element mechanically linked to a control knob and by an electromagnet assembly of the magnetic group, in the first position the mobile element prevents the flow of gas through the cut-off valve, in the second position the mobile element permits the flow of gas through the cut-off valve, the control knob moveable between first and second settings, in the first setting of the control knob the mechanical element acts to place the mobile element in the second position, in the second setting of the control knob the mechanical element does not act upon the mobile element with the movement of the mobile element between the first and second positions being under the control of the electromagnet assembly of the magnetic group and not under the control of the mechanical element; and
   an electrical control unit electrically coupled to the electromagnet assembly and capable of wirelessly emitting information to a remote control unit when the control knob is in the second setting, the electrical control unit being capable of acting upon the electromagnet assembly to control the position of the mobile element when the control knob is in the second setting, the electrical control unit not capable of wirelessly emitting information to the remote control unit when the control knob is in the first setting.

2. A barbecue according to claim 1, wherein the control knob is operably coupled to a first switch located in an electrical circuit between a power source and the electrical control unit, the first switch having an open state when the control knob is in the first setting and a closed state when the control knob is in the second setting, when the first switch is in the open state power from the power source is prevented from reaching the electrical control unit, when the first switch is in the closed state power from the power source is permitted to reach the electrical control unit.

3. A gas barbecue according to claim 1, further comprising a thermocouple situated adjacent the gas burner and electrically coupled to the electrical control unit, the electrical control unit configured to act upon the electromagnet assembly to cause the mobile element of the cut-off valve to assume the first position upon a signal received in the control unit from the thermocouple being indicative of an absence of a flame at the gas burner.

4. A gas barbecue according to claim 1, further comprising a pilot flame burner located adjacent the burner and a thermocouple situated adjacent the pilot flame burner and electrically coupled to the electrical control unit, the pilot flame burner coupled to the gas supply conduit system, the electrical control unit configured to act upon the electromagnet assembly to cause the mobile element of the cut-off valve to assume the first position upon a signal received in the control unit from the thermocouple being indicative of an absence of a flame at the pilot flame burner.

5. A gas barbecue according to claim 1, further comprising a temperature sensor electrically coupled to the electrical control unit and adapted to monitor the temperature of a food item cooked on the barbecue, the electrical control unit configured to receive a signal from the temperature sensor and to emit a wireless signal to the remote control unit indicative of the temperature of the food item.

6. A gas barbecue according to claim 1, wherein the electrical control unit is capable of wirelessly receiving and executing instructions received from the remote control unit, the electrical control unit configured to act upon the electromagnet assembly to cause the mobile element of the cut-off valve to transition from the second position to the first position upon a wireless signal received in the electrical control unit from the remote control unit being indicative that the remote control unit is located more than a predetermined distance away from the barbecue.

7. A gas barbecue according to claim 1, further comprising a thermocouple situated adjacent the gas burner and electrically coupled to the electromagnet assembly through a second switch having an open position and a closed position, when heated by a flame of the gas burner the thermocouple provides sufficient current to the electromagnet assembly to cause the mobile element to assume or maintain the second position when the second switch is in the closed position, in the open position the second switch prevents the electromagnet assembly from receiving a current from the thermocouple causing the mobile element to assume or maintain the first position, the electrical control unit configured to cause the second switch to assume the open position upon receiving a wireless signal from the remote control unit indicative that the remote control unit is located more than a predetermined distance away from the barbecue.

8. A gas barbecue according to claim 2, further comprising a thermocouple situated adjacent the gas burner and electrically coupled to the electromagnet assembly through a second switch having an open position and a closed position, when heated by a flame of the gas burner the thermocouple provides sufficient current to the electromagnet assembly to cause the mobile element to assume or maintain the second position when the second switch is in the closed position, in the open position the second switch prevents the electromagnet assembly from receiving a current from the thermocouple causing the mobile element to assume or maintain the first position, the electrical control unit configured to cause the second switch to assume the open position upon a wireless signal received from the remote control unit indicative that the remote control unit is located more than a predetermined distance away from the barbecue.

9. A barbecue according to claim 1, further comprising an igniter located adjacent the gas burner, the igniter controlled by the electrical control unit to ignite a gas at the gas burner upon the control knob assuming the first setting.

10. A barbecue according to claim 1, wherein the electrical control unit and the remote control unit wirelessly communicate by means of radio frequency signals or infrared signals.

11. A gas barbecue comprising:
a gas burner,
a gas supply conduit system configured to direct a gas from a gas inlet to the gas burner,
an electrical control unit capable of wirelessly emitting information to a remote control unit; and
a cut-off valve situated in the gas supply conduit system, the cut-off valve comprising magnetic group having a mobile element that is moveable between a first position and a second position, the mobile element capable of being moved between the first and second positions by a movement of a mechanical element mechanically linked to a control knob and by an electromagnet assembly of the magnetic group, the electromagnet assembly electrically coupled to the electrical control unit, in the first position the mobile element prevents the flow of gas through the cut-off valve, in the second position the mobile element permits the flow of gas through the cut-off valve, the mobile element urged toward the first position by a resilient member of the magnetic group, in a first state the mechanical element does not act upon the mobile element to permit the mobile element to assume the first position, in a second state the mechanical element acts upon the mobile element to cause the mobile element to assume the second position, the control knob operably coupled to a first switch located in an electrical circuit comprising the electrical control unit, the first switch having an open state and a closed state, when the first switch is in the open state the electrical control unit is not capable of emitting information to the remote control unit, when the first switch is in the closed state the electrical control unit being capable of emitting information to the remote control unit, the control knob moveable between first, second and third settings, in the first setting of the control knob the mechanical element is in the first state and the first switch is in the open position, in the second setting of the control knob the mechanical element is in the second state and the first switch is in the open position, in the third setting of the control knob the mechanical element is in the first state and the first switch is in the closed position.

12. A barbecue according to claim 11, wherein the first switch is located between a power supply source and the electrical control unit.

13. A barbecue according to claim 11, wherein the electrical control unit is capable of acting upon the electromagnet assembly to control the position of the mobile element when the control knob is in the second setting.

14. A gas barbecue according to claim 11, further comprising a thermocouple situated adjacent the gas burner and electrically coupled to the electrical control unit, the electrical control unit configured to act upon the electromagnet assembly to cause the mobile element of the cut-off valve to assume the first position upon a signal received in the control unit from the thermocouple being indicative of an absence of a flame at the gas burner.

15. A gas barbecue according to claim 11, further comprising a pilot flame burner located adjacent the burner and a thermocouple situated adjacent the pilot flame burner and electrically coupled to the electrical control unit, the pilot flame burner coupled to the gas supply conduit system, the electrical control unit configured to act upon the electromagnet assembly to cause the mobile element of the cut-off valve to assume the first position upon a signal received in the control unit from the thermocouple being indicative of an absence of a flame at the pilot flame burner.

16. A gas barbecue according to claim 11, further comprising a temperature sensor electrically coupled to the electrical control unit and adapted to monitor the temperature of a food item cooked on the barbecue, the electrical control unit configured to receive a signal from the temperature sensor and to emit a wireless signal to the remote control unit indicative of the temperature of the food item.

17. A gas barbecue according to claim 11, wherein the electrical control unit is capable of wirelessly receiving and executing instructions received from the remote control unit, the electrical control unit configured to act upon the electromagnet assembly to cause the mobile element of the cut-off valve to transition from the second position to the first position upon a signal received in the electrical control unit from the remote control unit being indicative that the remote control unit is located more than a predetermined distance away from the barbecue.

18. A gas barbecue according to claim 11, further comprising a thermocouple situated adjacent the gas burner and electrically coupled to the electromagnet assembly through a second switch having an open position and a closed position, when heated by a flame of the gas burner the thermocouple is configured to provide sufficient current to the electromagnet assembly to cause the mobile element to assume or maintain the second position when the second switch is in the closed position, in the open position the second switch prevents the electromagnet assembly from receiving a current from the thermocouple causing the mobile element to assume or maintain the first position, the electrical control unit configured to cause the second switch to assume the open position upon receiving a wireless signal from the remote control unit indicative that the remote control unit is greater than a predetermined distance from the barbecue.

19. A barbecue according to claim 11, further comprising an igniter located adjacent the gas burner, the igniter controlled by the electrical control unit to ignite a gas at the gas burner upon the control knob assuming the second setting.

20. A barbecue according to claim 11, wherein the electrical control unit and the remote control unit wirelessly communicate by means of radio frequency signals or infrared signals.

* * * * *